Patented June 18, 1946

2,402,128

UNITED STATES PATENT OFFICE 2,402,128

MODIFIED ZEIN PRODUCTS

Cyril D. Evans, Peoria, Ill., assignor, by mesne assignments, of one-half to A. E. Staley Manufacturing Company, Decatur, Ill., a corporation of Delaware, and one-half to American Maize-Products Company, New York, N. Y., a corporation of Maine No Drawing. Application July 16, 1941, Serial No. 402,702

9 Claims. (Cl. 106—153)

The present invention relates to the modification of zein, the prolamine from corn. As provided commercially, dry zein may contain about 7% to 8% moisture content. With difficulty, it can be made drier.

Prolamines are defined as the alcohol-soluble proteins. Zein is soluble in aqueous monohydric alcohols and in many other solvents and solvent mixtures, with and without water. The composition of a solution in volatile solvent ingredients, zein, and non-volatile constituents, determines the stability of the solution. Some solutions of zein tend to gel and some are stable for long periods of time. Temperature is a factor affecting stability. The stability of zein solutions is dependent on so many factors that it is at least a very complicated and controversial subject. Even agitation is a factor affecting stability. Modification of the zein is another influential factor.

It is known that aldehydes modify zein. For example, dry commercial zein treated with a substantially anhydrous aldehydes, such as acetaldehyde, butyraldehyde and benzaldehyde, for a long time at ordinary temperature, or from 3 to 10 days at 50° C., or for 2 hours at 15 lbs. steam pressure (121° C.), is so modified that its ordinary solubility in aqueous ethyl alcohol of 85% by weight of alcohol, and in diethylene glycol, is lost, and it is substantially insoluble. The present invention is based upon a study of the nature of reaction between aldehydes and zein, and is directed to securing a solution of aldehyde-treated zein from which improved solid compositions of aldehyde-treated zein may be obtained. According to the present invention the aldehyde is allowed to act on zein without losing the property of forming a solution of the modified zein, so that upon forming a solid product from the solution, such as a film or coat, a less soluble and a more water-resistant zein solid may be secured.

From the study of the reaction of aldehydes, it has been found that in non-aqueous and in aqueous solutions of zein, an aldehyde effects a union with zein which is believed from considerable evidence to be both a chemical combination and an absorption complex. Air-dried zein products of such treatments with aldehyde yield free aldehyde on long exposure to high vacuum. At least the absorption union is so strong that dry solid zein compositions may be obtained which may be baked to bring about some final reaction dependent upon the aldehyde. The present invention aims to modify zein in solution by the presence of aldehyde, to such an extent that a dry zein body may be obtained from solution, containing aldehyde or derivative thereof, such that on baking a further modification of the zein occurs.

The conditions for modifying the zein in solution by aldehyde may vary widely. On standing for 3 to 6 days at 50° C., or on heating for only 2 hours at 15 lbs. steam pressure, the desired results may be obtained using no added acid. Added acid speeds the reaction, but it may so modify the solution, that gelling may result. Alkali addition does not have the accelerating effect exhibited by acid.

The treatment of zein in solution with aldehyde is carried out, under non-gelling conditions for the particular solution, to an extent such that when the zein product is tested in a certain way, a new property is evidenced. The test comprises forming a film or coat by evaporating volatile solvent from the solution, air-drying the film or coat, and baking the air-dry film or coat at 130° C. for 3 hours. If the baked film does not turn white or blush when wet with water, the action of the aldehyde and the zein in solution is sufficiently effected. If this point of sufficiency has been passed, it may be possible to secure a non-blushing film by baking at 130° C. for less than three hours, as for example in 2 hours. However, such film will still meet the prescribed test. The presence of acid tends to produce the non-blushing film in less baking time than a like solution lacking the acid. An excessive time at elevated temperature for the treatment of zein in solution by aldehyde, likewise shortens the time of baking for effecting a non-blushing film. Increased amounts of aldehyde in the solution also shorten the time of baking. Therefore, it is to be understood that the aldehyde-containing solution of zein must react at least to an extent to meet the test, but it may go beyond the point, and still meet the test. It may extend to any point short of gelling of the solution under treatment or when cooled from an elevated treating temperature.

Commercial formalin solutions as well as anhydrous aldehydes, such as acetaldehyde, propionaldehyde, butyraldehyde, furfural, and benzaldehyde may be employed, the amount of water present being not pertinent to the character of the reaction, but being pertinent to the stability or the gelling of the resultant solution.

Elevated temperature for the aldehyde-zein solution is not strictly essential for the results, but for practical purposes it is considered essential to the present invention to employ a temperature of at least 50° C. At ordinary temperature it takes about 4 months to condition the solution of modified zein, without acid, to meet the test. At 50° C., it takes from 3 to 6 days. At about 120° C. (15 lbs. steam pressure), it takes only two hours. Where elevated temperature is used the charge usually requires elevated pressure.

In using commercial formaldehyde the alcohol of the liquid reaction phase necessarily becomes more aqueous than when higher aldehydes in less aqueous form are used, but the higher aldehydes may also be used in equally aqueous alcoholic solutions. The higher aldehydes may be used in substantially anhydrous solutions.

The liquid reaction phase necessarily employs aldehyde in excess in order to secure the result, so that in evaporating solvent free aldehyde is present. Air-drying of deposited zein permits loss of excess aldehyde. Where large excess of less volatile aldehydes is present, drying of the deposited zein should be permitted to a point to avoid blistering by retained aldehyde when performing the baking. Vacuum drying or a moderate drying at an elevated temperature up to 100° C. before baking will avoid blistering.

The aldehyde used for the reaction mass becomes partly associated with the zein, and partly acts as a solvent component. Therefore, use of excess aldehyde is expressed herein as a solvent use of aldehyde.

The following examples illustrate the invention. Zein employed contains 7% moisture unless otherwise specified.

Example 1.—Formalin, ethyl alcohol 20 grams of zein, 50 cc. absolute ethyl alcohol, and 20 cc. of commercial aqueous formalin (40% by volume and 37% by weight of formaldehyde) are heated for 1 hour in an autoclave at 15 lbs. steam pressure (121° C.). The cooled solution is spread out to form a film on evaporation of the liquid solvent. The film is air-dried. The dried film is baked for either 2 hours or 3 hours at 130° C., forming a film which is non-blushing on being wet with water.

If 15 cc. of formalin is used the solution gels on removal from the autoclave. If 25 cc. of formalin is used the results are as described for 20 cc.

Example 2.—Formalin, ethyl alcohol 20 grams of zein, 50 cc. of 95% (by volume) ethyl alcohol (which is 92.4% by weight), and 18 cc. of formalin solution, are treated to provide a film as in Example 1. The film baked for 2 hours at 130° C. shows a slight blush, but when baked for 3 hours, shows no blush.

The 18 cc. of formalin is just about the minimum usage, below which gelling occurs on removal from the autoclave.

Example 3.—Formalin, ethyl alcohol 20 grams of zein, 50 cc. of 85% (by weight) ethyl alcohol, and 18 cc. of formalin solution, are treated as in Example 2 with results as described therein.

Example 4.—Formalin, ethyl alcohol 20 grams of zein, 50 cc. of 65% (by weight) ethyl alcohol, and 15 cc. of formalin, are autoclaved at 121° C. for 1 hour. The solution is just about at the gelling point. An air-dried film is formed which in baking for 2 hours at 130° is non-blushing.

If less than 15 cc. of formalin is used, the solution gels on removal from the autoclave. If 18 cc. of formalin is used the autoclaved solution is non-gelling, and at 1 hour of baking the film blushes, while at 2 hours of baking it is non-blushing. If 21 cc. of formalin is used, the film has only a faint blush when baked for 1 hour at 130°, but at 2 hours in non-blushing.

Example 5.—Mixed aldehydes, ethyl alcohol 20 grams of zein, 50 cc. of 95% (by volume) ethyl alcohol, 5 cc. of formalin, and 10 cc. of acetaldehyde, are autoclaved at 121° C. for 1 hour. A film is deposited from the resulting solution, and air-dried. The dried film baked for 1 hour at 130° C. is non-blushing.

Example 6.—Acetaldehyde, methyl alcohol 40 grams of zein, 100 cc. of absolute methyl alcohol, and 15 cc. of acetaldehyde are heated in an autoclave at 121° C. for 2 hours. The solution is employed to deposit a film, which is air-dried. In baking, at 130° C. for 3 hours, the film is rendered non-blushing.

Under the same conditions, using 5 cc. and 10 cc. of the acetaldehyde, the cooled solutions are stable for 1 and 7 days respectively, and the baked films blush. When the acetaldehyde is increased up to 40 cc. the results are as described for 15 cc.

Examples 7 to 18.—Acetaldehyde, methyl alcohol

Using the same conditions and amounts as described in Example 6, and with variations as follows, the results are as given below.

| Example | Weight per cent MeOH | Cc. aldehyde | Blush |
| --- | --- | --- | --- |
| 7 | 90 | 20 | Faint. |
| 8 | 90 | 26 | No. |
| 9 | 90 | 32 | No. |
| 10 | 90 | 40 | No. |
| 11 | 80 | 15 | Slight. |
| 12 | 80 | 26 | No. |
| 13 | 80 | 32 | No. |
| 14 | 80 | 40 | No. |
| 15 | 70 | 20 | No. |
| 16 | 70 | 26 | No. |
| 17 | 70 | 32 | No. |
| 18 | 70 | 40 | No. |

Examples 19 to 33.—Acetaldehyde, ethyl alcohol

Using 100 cc. of alcohol of varying aquosity, 40 grams of zein, and varying amounts of acetaldehyde, and using standardized conditions as follows: 2 hours autoclaving at 121° C., forming air-dried films, and baking for 3 hours, at 130° C., the blushing results are as follows:

| Example | Weight percent EtOH | Cc. aldehyde | Blush |
| --- | --- | --- | --- |
| 19 | 92.4 | 10 | Faint. |
| 20 | 92.4 | 15 | No. |
| 21 | 92.4 | 20 | No. |
| 22 | 92.4 | 26 | No. |
| 23 | 92.4 | 32 | No. |
| 24 | 92.4 | 40 | No. |
| 25 | 85 | 15 | No. |
| 26 | 85 | 20 | No. |
| 27 | 85 | 26 | No. |
| 28 | 85 | 32 | No. |
| 29 | 85 | 40 | No. |
| 30 | 65 | 20 | No. |
| 31 | 65 | 26 | No. |
| 32 | 65 | 32 | No. |
| 33 | 65 | 40 | No. |

Example 34.—Butyraldehyde, ethyl alcohol 40 grams of zein, 100 cc. of 85% (by weight) ethyl alcohol, and 32 cc. of butyraldehyde, were autoclaved for 2 hours at 121° C. An air-dried film was formed, and baked for 3 hours at 130° C. The baked film is non-blushing with water.

Example 35.—Plasticizers

Repeating Example 34 with 30 cc. of butyraldehyde, and plasticizer, the same results were obtained. The following plasticizers and amounts have been employed in the repetitions.

| Example | Plasticizer | Amount |
|---|---|---|
| | | Grams |
| 35a | Dibutyl tartrate | 15 |
| 35b | Monobutyl tartrate | 15 |
| 35c | Equal part mixture of di- and monobutyl tartrate | 15 |

Example 36.—Benzaldehyde, ethyl alcohol 40 grams of zein, 100 cc. of 95% (by volume) ethyl alcohol, 50 cc. of benzaldehyde; are autoclaved for 1 hour at 121° C. An air-dried film, baked at 130° C. for 3 hours is nonblushing.

Example 37

Repeating Example 36 with 2 hours autoclaving, the resulting film is non-blushing when baked for only 1 hour at 130° C.

Example 38.—Propionaldehyde

Ethyl alcohol, 40 grams of zein, 100 cc. of 85% by weight ethyl alcohol, 40 to 50 cc. of propionaldehyde; are autoclaved for one hour at 121° C. An air-dried film, baked at 130° C. for three hours exhibits but a faint blush.

Acid accelerator

In general it was found that increased acid content speeds the reaction, but according to the nature of the solution, the higher amounts of different strong acids tend to product gelling. Acetic acid does not do this, but hydrochloric and sulphuric acids do. For example, 3 cc. of normal HCl solution added to 20 grams of zein in 50 cc. of 85% (by weight) ethyl alcohol, causes gelling during autoclaving.

Example 39.—Acid catalyst

When 20 grams of zein in 50 cc. of 85% (by weight) ethyl alcohol, and 20 cc. of acetaldehyde are autoclaved for 2 hours at 121° C., the air-dried film is non-blushing in 2 hours baking at 130° C., and faintly blushing at the end of the first hour of baking.

When 0.2 cc. of N/10 HCl solution is present, the film is non-blushing as early as 1 hour in baking at 130° C. This is also true in using 1 cc. or 2 cc. of normal H$_2$SO$_4$ solution. While 2 cc. of normal HCl will produce a like result, 3 cc. or more of normal HCl causes gelling on removal from the autoclave. Using 2 cc. of normal HCl, permits shortening the autoclave time to 1¼ hours, while still securing a non-blushing film at 1 hour of baking at 130° C. In the same shortened time of autoclaving the use of 3 cc. of normal HCl, likewise produces gelling on removal from the autoclave.

Example 40.—Acid 20 grams of zein, 50 cc. 85% (by weight) alcohol, 20 cc. of acetaldehyde and 1 cc. of glacial acetic acid or of normal HCl, are autoclaved for ½ hour at 121° C. The air-dried film is baked at 130° C. At the end of ½ hour baking it blushes slightly with water, but in one hour of baking it is non-blushing.

If the acid is increased to 2 cc. of the normal HCl, or to 2.5 cc. of glacial acetic acid, the film is non-blushing in ½ hour of baking. Under like conditions, using no acid, the film blushes. 3 cc. of normal HCl causes the solution to gel on removal from the autoclave, but 5 cc. of glacial acetic acid does not do this and forms a non-blushing film in ½ hour baking at 130° C.

Example 41

20 grams of zein, 50 cc. of 85% (by weight) ethyl alcohol, 25 cc. of acetaldehyde, and 2 cc. of normal HCl, autoclaved for 2 hours at 121° C., give a film which on baking at 130° C. is faintly blushing at 1 hour, and non-blushing at 2 hours. Increasing the aldehyde, as to 35 cc. or more, gives a non-blushing film in 1 hour of baking.

Example 42.—Reaction at 50° C.

20 grams of zein, 50 cc. of 85% (by weight) ethyl alcohol, 20 cc. of acetaldehyde, are heated at 50° C. up to 10 days, and a film baked at various times at 130° C., gives the following results as to blush.

| Days in liquid reaction | Hours baked | Blush |
|---|---|---|
| 3 | 3 | Faint. |
| 3 | 5 | Do. |
| 3 | 6 | Do. |
| 4 | 3 | Do. |
| 5 | 4½ | No. |
| 6 | 3 | No. |
| 10 | 3 | No. |

The baked product

The non-blushing films of zein are insoluble in 85% (by weight) ethyl alcohol, and in diethylene glycol, which are excellent solvents for the original zein. The aldehyde treated zein in its (baked or unbaked) form has a much less water absorption than like products made of zein not subjected to the action of aldehyde.

The dry zein treated with anhydrous acetaldehyde butyraldehyde, and benzaldehyde in amount by weight from a minimum of 75% to a maximum of 150% to 200% based on zein, at 121° C., for 2 or more hours, and in the cases of the acetaldehyde and the butyraldehyde at 50° C. for 3 to 10 days, is insoluble in the same solvent materials as those described for the non-blushing films.

Since it is known that the air-dried films contain aldehyde which is removable in a vacuum, as from a possible absorption complex, it is believed that the baking completes some reaction leading to insolubility. It is therefore believed that the present invention offers a means to divide the reaction into two stages, whereby a soluble aldehyde-modified zein is obtained, from which a potentially reactive solid form of zein is secured containing in a complex a form of aldehyde reactive with some modified form of zein, to produce improved zein products.

The nitrogen contents of the dry-aldehyde-treated dry-zein, and of the non-blushing films are lower than in dry zein, indicating the possibility of some addition to the molecule.

In the following claims the invention is set forth in its comprehensive terms, and it is to be understood that the variations set forth above, and others are contemplated as falling within the scope of the invention.

I claim:

1. A process of producing a modified zein which comprises reacting zein in a solution of volatile solvent containing as a component throughout the reaction an aldehyde at a temperature of at least 50° C. to form a solution of zein capable of depositing a body which when air-dried and then baked at 130° C. for three hours is substantially non-blushing with water.

2. A process of producing a modified zein which comprises reacting zein in a solution of volatile solvent containing as ingredients through the reaction water and an aldehyde at a temperature of at least 50° C. to form a solution of zein capable of depositing a body which when air-dried and then baked at 130° C. for three hours is substantially non-blushing with water.

3. A process of producing a modified zein which comprises reacting zein dissolved in a volatile solvent of substantially anhydrous character containing as an ingredient throughout the reaction an aldehyde at a temperature of at least 50° C. to form a solution of zein capable of depositing a body which when air-dried and then baked at 130° C. for three hours is substantially non-blushing with water.

4. A process of producing a modified zein which comprises reacting zein in a solution of volatile solvent containing as an ingredient throughout the reaction acetaldehyde at a temperature of at least 50° C. to form a solution of zein capable of depositing a body which when air-dried and then baked at 130° C. for three hours is substantially non-blushing with water.

5. A process of producing a modified zein which comprises reacting zein in a solution of volatile solvent containing as an ingredient added anhydrous aldehyde at a temperature of at least 50° C. to form a solution of zein capable of depositing a body which when air-dried and then baked at 130° C. for three hours is substantially non-blushing with water.

6. The process of claim 1 in which a small amount of acid is present as catalyst.

7. A process of producing a zein body which is substantially non-blushing with water which comprises reacting the zein in a solution of volatile solvent containing as an ingredient an aldehyde at a temperature of at least 50° C. for a time to avoid gelling of the solution, evaporating volatile solvent from the solution to provide a solid zein body, and baking the said body of zein at 130° C. for a time sufficient to render the zein body substantially non-blushing when wet with water.

8. The process of claim 7 in which a small amount of acid is present in solution, whereby to accelerate the action in solution and in baking.

9. A process of producing a modified heat-reactive zein solid which comprises reacting zein in a solution of volatile solvent containing as a component throughout the reaction an aldehyde at a temperature of at least 50° C. to form a solution of zein capable of depositing a body which when air-dried and then baked at 130° C. for three hours is substantially non-blushing with water, and evaporating the solvent from said solution to form a solid retaining aldehyde associated with zein and reactive in its retained form on the application of heat to alter the physical properties of the solid zein.

CYRIL D. EVANS.